United States Patent
Rosenberg

[11] 3,914,013
[45] Oct. 21, 1975

[54] COHERENT RADIATION BEAM COUPLER

[76] Inventor: Larry Rosenberg, 115 N. Wetherly Drive, Beverly Hills, Calif. 90211

[22] Filed: Jan. 7, 1974

[21] Appl. No.: 431,087

[52] U.S. Cl. ............ 350/96 B; 128/303.1; 128/397
[51] Int. Cl.² ...................... G02B 5/16; A61N 5/06
[58] Field of Search ................. 350/96 B, 96 R; 331/94.5 A; 128/303.1, 395–398; 219/121 L, 121 LM

[56] References Cited
UNITED STATES PATENTS

| | | | |
|---|---|---|---|
| 3,538,919 | 11/1970 | Meyer | 128/398 |
| 3,571,555 | 3/1971 | Townes et al. | 331/94.5 A X |
| 3,638,312 | 2/1972 | Szware et al. | 350/96 B X |
| 3,642,007 | 2/1972 | Roberts et al. | 128/395 |
| 3,659,613 | 5/1972 | Bredemeier | 331/94.5 A X |
| 3,669,524 | 6/1972 | Shio | 350/96 B X |
| 3,703,176 | 11/1972 | Vassiliadis et al. | 128/395 |
| 3,710,091 | 1/1973 | Holcomb | 350/96 B X |
| 3,710,798 | 1/1973 | Bredemeier | 350/96 B X |
| 3,782,823 | 1/1974 | Kantorski et al. | 331/94.5 A X |
| 3,783,874 | 1/1974 | Koester et al. | 128/303.1 |
| 3,803,379 | 4/1974 | McRay | 219/121 L |

*Primary Examiner*—David H. Rubin

[57] ABSTRACT

A coherent radiation beam coupler adapted for concentrating and focusing a radiation beam such as the beam of an ion LASER. The device is a unitary assembly of components, including adjustable iris diaphragms, a timed shutter, a chopper, and focusing lens aligned along the beam axis for concentrating, focusing, and directing coherent LASER beams. The assembly includes a mounting means for the end part of light or radiation transmitting from the fiber optics group which leads to a point of utilization such as an endoscope useful in surgical procedures.

1 Claim, 6 Drawing Figures

COHERENT RADIATION BEAM COUPLER

SUMMARY OF THE INVENTION

The invention resides in the field of LASER beams and, more particularly, an ion LASER, the properties of which may be utilized in various ways, including surgical procedures, such as cauterizing a lesion or otherwise.

LASERs have now been known for some time, and LASER sources are now commercially available. A LASER beam is essentially a radiation beam of ions which when activated are excited to radiate light constituted by photons. The properties of LASER beams may be utilized in various ways, as stated. The beam is directed to the point of utilization through fibers of a fiber optics bundle.

In order for the LASER beam from the source to be effectively utilized, it is necessary that it be concentrated, focused, and directed and further that it be possible to control the energy in the beam. The herein invention is one calculated to meet these requirements. In the preferred, exemplary form of the invention as described, it takes the form of a unitary device which may be referred to as a coherent radiation or optical coupler which provides coupling between the source of the LASER beam and the fiber optics bundle leading to the point of utilization. Preferably, the elements of the coupling unit are mounted on a base and oriented whereby the coupling unit can be mounted or associated with the LASER source to provide the direct availability of the controlled, concentrated, and focused beam of coherent radiation.

In the exemplary form of the invention as described in detail herein, it comprises elements including adjustable iris diaphragms aligned with the axis of the ion LASER beam and with a focusing lens adjustable with respect to three mutually perpendicular axes for focusing. A timed shutter is also provided aligned with said axis for purposes of making timed exposures or single pulses of radiation of predetermined length. Preferably there is provided a chopper in the form of a rotating element which intercepts the beam for pulsing and thus making it available to control the energy content of the beam by way of the frequency and/or duration of the pulses. A holder is provided for the end of the fiber optics bundle in alignment with the axis so as to receive the controlled, concentrated, and focused beam.

In the light of the foregoing, the primary object of the invention is to realize an integrated unit or device constituting a coherent radiation coupler adapted for use with a LASER beam for purposes of concentrating, focusing, and controlling the energy content of the beam. The coupler is positioned between the LASER source and the fiber optics bundle.

A further object is to realize the capability in a unitary, integrated device of the type referred to of providing for concentrating, focusing, and controlling the energy content of a LASER beam.

A further object is to realize a device or unit as in the foregoing embodying adjustable iris diaphragms, shutter means and a focusing lens aligned with an axis of the beam for purposes of concentrating it and focusing it on the end of a fiber optics bundle.

BRIEF DESCRIPTION OF THE DRAWINGS

Further objects and additional advantages of the invention will become apparent from the following detailed description and annexed drawings, wherein.

DESCRIPTION OF THE PREFERRED EMBODIMENT

Figure 1:
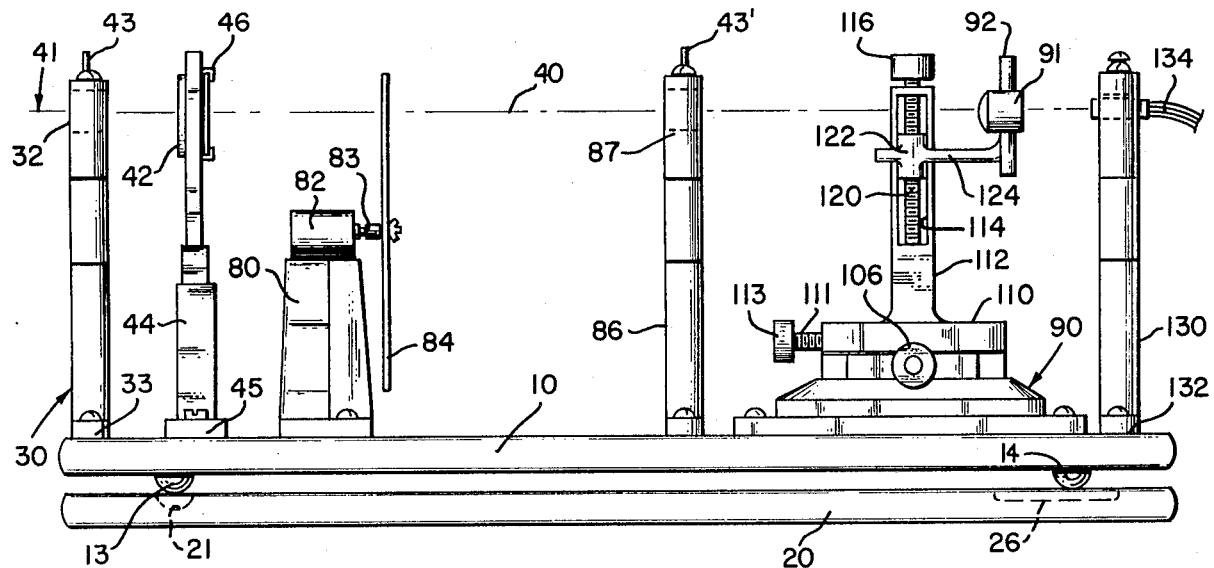
FIG. 1 is a partly schematic side elevational view of a preferred form of the invention.

In FIG. 1, numeral 10 designates a base or platform which is rectangular and may be made of any suitable material. On its underside, there are three supporting feet in the form of spheres or balls, two of which may be seen at 13 and 14 which are received in hemispherical recesses in plate 10. The coupler can be constructed in any size.

Numeral 20 designates another plate forming a sub-base on which base or platform 10 can be rested. Base 20 may be associated with or mounted on a frame or platform of the LASER source, such as a Spectra-Physics Model 370 Dye and Argon Model 164 ion LASER. Platform 20 has recesses or receptacles 21 and 22 adapted to receive the balls forming feet on platform 10. It has another receptacle or fitting 26 which is elongated as shown to receive the third ball-shaped foot so that the entire integrated unit as will be described can be adjustably positioned on subbase 20.

Figure 2:
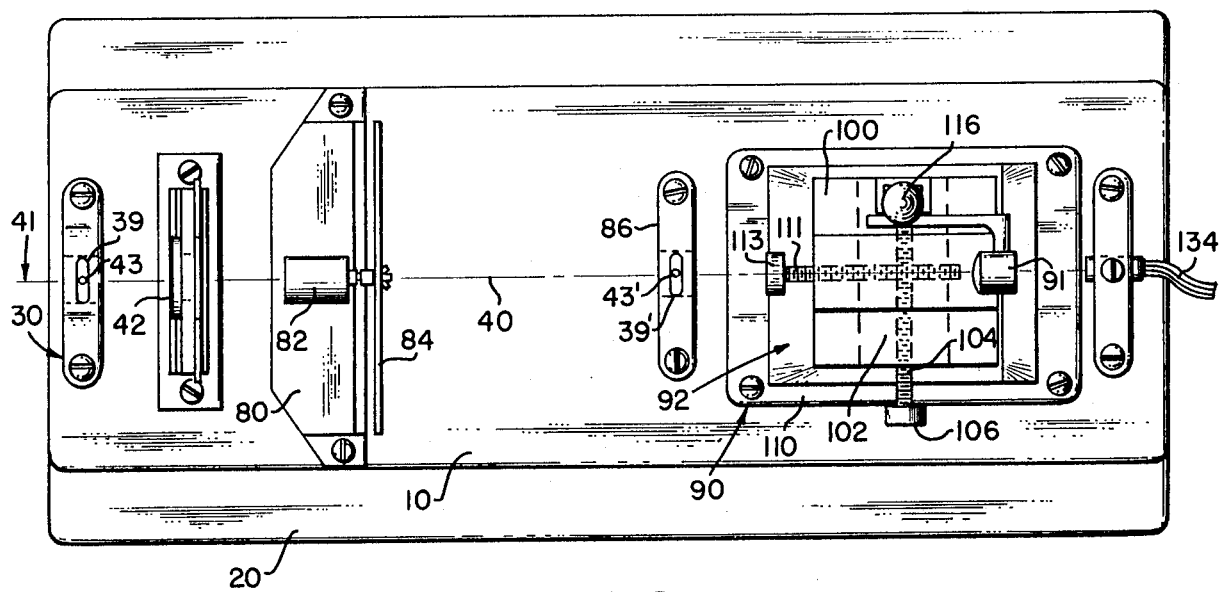
FIG. 2 is a plan view of the invention as shown in FIG. 1.
Figure 3:
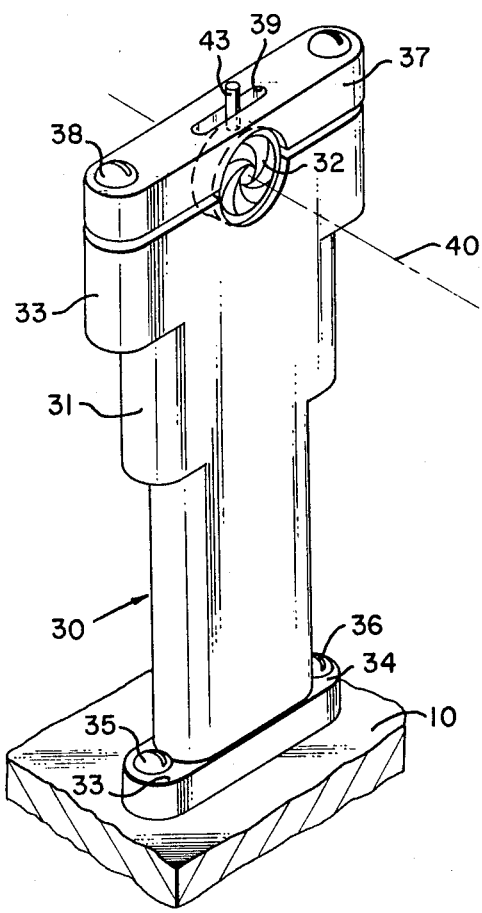
FIG. 3 is a detail view of the shutter assembly of FIGS. 1 and 2.

The various components of the coupler are assembled on base 10 as illustrated on FIGS. 1 and 2. In these figures, numeral 30 designates an upright support stand or bracket for an iris diaphragm 32 held and supported in the upper part of this stand or bracket which has feet 33 and 34 secured to platform 10 by screws 35 and 36. The iris diaphragm may be of a conventional type, and in the exemplary embodiment, it may have a maximum diameter of opening of 8 millimeters and a minimum diameter of opening of 1.5 millimeters. The optical axis or beam axis is designated at 40. The incoming LASER beam is designated at 41, the LASER source not being shown, but it may be a commercially available type as identified above. The stand has broader upper portions 31 and 33. Numeral 37 designates a top part or element secured to part 33 by secrews 38 and 39. It has slot 39 for lever or pin 43 for adjusting iris diaphragm 32.

Numeral 44 designates a support stand having a base 45 mounted on platform 10 in spaced relationship to mount 30. At the upper part of stand or mount 42 is carried a shutter mechanism 46 aligned with beam axis 40 embodying a vertical translational stage 47 for intercepting the beam. The shutter mechanism is preferably a commercially available type and may embody a timer for producing a timed exposure or timed interception or opening for passage of the beam. One usable type is manually reset, although electronic types are available which are automatically reset after operation. The stage 47 has a threaded bore or opening 48 to receive the shutter. Numerals 49 and 49' designate slide panels.

Figure 4:
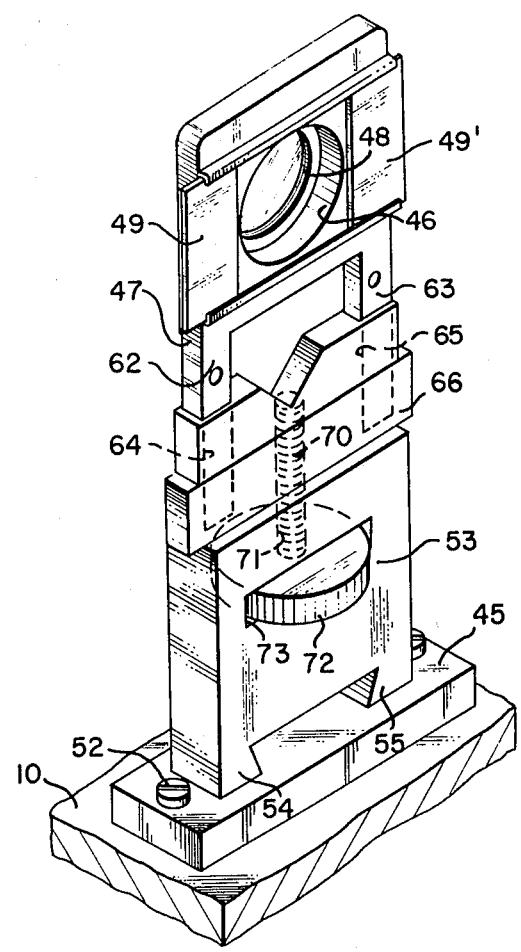
FIG. 4 is a detail view of the mount for the shutter of FIGS. 1 and 2.
Figure 5:
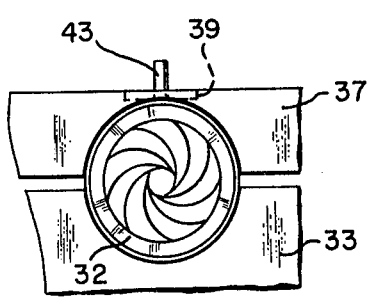
FIG. 5 is a detail view of the iris diaphragm.
Figure 6:
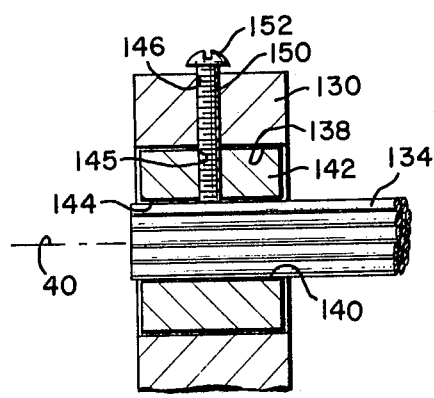
FIG. 6 is a detail view of a fitting in which the end of the fiber optics bundle is held.

The shutter mechanism is shown more in detail in FIG. 4. It is mounted on a base 45 attached to platform 10 by screws such as shown at 52. The stand embodies a support part 53 having feet 54 and 55 which are attached to platform 45 by screws 52. The vertically movable shutter stage is shown at 47 having in it a V-slot and depending legs 62 and 63 which move in bores 64 and 65 in guide plate 66 supported above member 53. Numeral 70 designates a lead screw which extends through a threaded bore 71 in member 53 and guide plate 66. The lead screw is rotatable by a knurled knob 72 carried by member 53 with the edge part of the knob extending out through a slot 73 in part 53 whereby it can be manually rotated for adjusting and resetting shutter plate 47. Clockwise rotation translates stage 47 upwardly and counterclockwise rotation translates it downwardly.

Numeral 80 designates a support mount or stand having a base 81 mounted on platform 10. This mount contains a battery and has a battery driven moter 82 on it as shown. The motor has a shaft 83. On this shaft is a rotor 84 having spokes to form a chopper having peripheral square angularly spaced cutouts. The rotor is positioned so that it can intercept beam axis 40 for purposes of pulsing the beam. The frequency and duration of pulses can be adjusted by varying the speed of the chopper rotor which may be adjustable and arranged, for example from zero to 60,000 rpm.

Numeral 86 designates a further stand like stand 30 which supports another similar iris diaphragm 87 which also is aligned with beam axis 40. The diaphragms are adjustable by adjusting pins 43 and 43'.

Numeral 90 designates a further base member supported on and secured to platform 10 which supports the support stand for the optical focusing lens 91 which is in a lens holder 92. The focusing lens may be of a commercially available type which may be 10X Nico 2.7 micro objective.

The support stand for the lens provides for focusing adjustments about three mutually perpendicular axes. The base member of the support stand of the focusing lens is designated at 100. Numeral 102 designates a slider which slides laterally in a pair of guide rails which can be adjusted by threaded stem 104 having on it adjusting knob 106. The guide rails for slider 102 are carried on another slider 110 which can slide fore and aft, that is, longitudinally another pair of rails carried on the base platform 100. Slider 100 is adjustable by way of threaded stem 111 having on its end a knob 113. Then, carried on slider 110 is an upright column 112 as may be seen in FIG. 1 having a bore in it with openings in the side wall of the column as designated at 114. Numeral 120 designates a threaded stem extending vertically in column 112 and having an adjusting knob 116 on its end. Carried on stem 120 is a threaded member 122 having an extending arm 124 which carries the lens holder 92 as shown.

Thus, it can be seen by adjustment of knobs 106, 113, and 116, the lens holder can be moved in any of three different planes in order to align the focusing lens 91 with axis 40.

Numeral 130 designates an upright column or support mount having base 132 mounted on platform 10 which carries the holder for the fiber optics bundle 134. In column 130 is a bore or opening 138 which receives a disc, washer, or holder 142 having a bore 144 in which the end of the fiber optics bundle is fitted. Member 142 and column 130 have aligned threaded bores 145 and 146 which receive a manually adjustable threaded member 150 having a head 152. The threaded member is able to clamp the end of the fiber optics bundle 134 as shown.

From the foregoing, those skilled in the art will readily understand the nature and construction of the invention. The base can be adjustably mounted on a separate stand or on the base platform of the LASER beam equipment with axis 40 aligned with the LASER beam being emitted. The iris diaphragms permit adjusting of the size or volume of the beam, and shutter mechanism 46 makes possible the setting of predetermined times of exposure. By means of chopper 84, a beam can be pulsed and the speed of rotation determines the frequency and duration of pulses to thereby predetermine the energy content of the beam which is focused by the adjustable focusing lens 91. The energy is received on the end of fiber optics bundle 134. Thus, the device provides an integrated combination of elements constituting a coupler which is utilized between the LASER source and the fiber optics bundle. The beam passing through the fiber optics bundle can be utilized in various different ways known in the art, such as in an endoscope used by a surgeon or otherwise.

The foregoing disclosure is representative of a preferred form of the invention and is to be interpreted in an illustrative rather than a limiting sense, the invention to be accorded the full scope of the claims appended hereto.

What is claimed is:

1. As an article of manufacture, adapted for use in internal surgery with an endoscope, a coupler device for focusing and concentrating a laser beam on to a fiber optics element comprising in combination: a base having mounted on it an assembly including adjustable iris diaphragm means and second spaced iris diaphragm means aligned along the laser beam axis for controlling the size and volume of the beam: means for directing a beam of coherent radiation along said axis and through said diaphragm means; an adjustable focusing lens positioned in alignment with said axis: means for holding an end part of a fiber optics element in alignment with said axis at one end of said base to receive a concentrated laser beam focused on ends of the fiber optic elements, shutter means having alignment with said axis and having the capability of timed interceptions of the beam, chopper means having an element movable in a position to interrupt said beam and to thereby control the energy of the beam and a support stand carrying said focusing lens adjustable relative to three mutually normal axes for purposes of focusing.

* * * * *